United States Patent
Forstpointner et al.

(10) Patent No.: US 10,632,438 B2
(45) Date of Patent: Apr. 28, 2020

(54) FLUIDIZED BED REACTOR AND PROCESS FOR PRODUCING POLYCRYSTALLINE SILICON GRANULES

(71) Applicant: Wacker Chemie AG, Munich (DE)

(72) Inventors: Gerhard Forstpointner, Kastl (DE); Dirk Weckesser, Mehring (DE)

(73) Assignee: WACKER CHEMIE AG, Munich (DE)

( * ) Notice: Subject to any disclaimer, the term of this patent is extended or adjusted under 35 U.S.C. 154(b) by 21 days.

(21) Appl. No.: 15/522,444

(22) PCT Filed: Oct. 21, 2015

(86) PCT No.: PCT/EP2015/074339
§ 371 (c)(1),
(2) Date: Apr. 27, 2017

(87) PCT Pub. No.: WO2016/066488
PCT Pub. Date: May 6, 2016

(65) Prior Publication Data
US 2017/0312724 A1  Nov. 2, 2017

(30) Foreign Application Priority Data
Oct. 28, 2014  (DE) .......... 10 2014 221 928

(51) Int. Cl.
*B01J 8/24* (2006.01)
*C01B 33/033* (2006.01)
(Continued)

(52) U.S. Cl.
CPC ............... *B01J 8/24* (2013.01); *B01J 8/1827* (2013.01); *B01J 8/1836* (2013.01); *C01B 33/03* (2013.01); *C01B 33/033* (2013.01); *F23C 10/20* (2013.01); *B01J 2208/00752* (2013.01); *B01J 2208/00902* (2013.01)

(58) Field of Classification Search
CPC .......... B01J 8/24; B01J 8/1827; B01J 8/1836; C01B 33/03; C01B 33/033; F23C 10/20
See application file for complete search history.

(56) References Cited

U.S. PATENT DOCUMENTS 4,786,477 A  11/1988  Yoon et al.
4,871,524 A  10/1989  Allen
(Continued)

FOREIGN PATENT DOCUMENTS

CN  101378989 A  3/2009
CN  101676203 A  3/2010
(Continued)

OTHER PUBLICATIONS

Pyrotek Inc., "Flexibile Graphite," Apr. 20, 2010, XP055243232 https://pyrotek-inc.com/documents/datasheets/942_-_Flexibile_Graphite_-_E4.pdf of Jan. 20, 2016.
(Continued)

*Primary Examiner* — Melvin C. Mayes
*Assistant Examiner* — Michael Forrest
(74) *Attorney, Agent, or Firm* — Brooks Kushman P.C.

(57) ABSTRACT

Contamination of fluidized bed-produced polycrystalline granules by phosphorus is reduced by employing as seals and/or packings, graphite containing <500 ppmw of phosphorus.

12 Claims, 2 Drawing Sheets

(51) Int. Cl.
*F23C 10/20* (2006.01)
*B01J 8/18* (2006.01)
*C01B 33/03* (2006.01)

(56) References Cited

U.S. PATENT DOCUMENTS

| | | | |
|---|---|---|---|
| 4,883,687 A | 11/1989 | Gautreaux et al. | |
| 4,900,411 A | 2/1990 | Poong et al. | |
| 4,921,026 A * | 5/1990 | Flagella | C01B 33/035 148/33 |
| 5,382,412 A | 1/1995 | Kim et al. | |
| 7,029,632 B1 | 4/2006 | Weidhaus et al. | |
| 7,708,828 B2 | 5/2010 | Weidhaus et al. | |
| 8,535,614 B2 * | 9/2013 | Chu | B01J 8/087 422/199 |
| 2003/0159647 A1 | 8/2003 | Arvidson et al. | |
| 2008/0267834 A1* | 10/2008 | Kim | B01J 3/046 422/139 |
| 2008/0299291 A1 | 12/2008 | Weidhaus et al. | |
| 2011/0212011 A1 | 9/2011 | Chu | |
| 2012/0183686 A1 | 7/2012 | Ohs | |
| 2012/0193214 A1 | 8/2012 | Paetzold et al. | |
| 2013/0189176 A1 | 7/2013 | Wochner et al. | |

FOREIGN PATENT DOCUMENTS

| | | | |
|---|---|---|---|
| CN | 203516728 U * | 4/2014 | F16J 15/10 |
| EP | 1 544 167 A1 | 6/2005 | |
| EP | 2 077 252 A2 | 7/2009 | |
| GB | 2 185 008 A | 7/1997 | |
| JP | 06127923 A * | 5/1994 | C01B 33/035 |
| KR | 20080098322 A | 11/2008 | |
| KR | 20140005199 A | 1/2014 | |
| WO | 2006062660 A2 | 6/2006 | |

OTHER PUBLICATIONS

GrafTech International: "Grafoil Products," Jan. 1, 2007, XP055243255 http://www.g4e.con/wordpress/wp-contents/files/graftech.pdf of Jan. 20, 2016.

GrafTech International: "GTA Flexible Graphite Technical Data Sheet 435," Jan. 21, 2013, XP055243059 http://www.graftech.com/wp-content/uploads/2015/03/TDS435-GTA.pdf of Jan. 20, 2016.

* cited by examiner

FLUIDIZED BED REACTOR AND PROCESS FOR PRODUCING POLYCRYSTALLINE SILICON GRANULES

CROSS REFERENCE TO RELATED APPLICATIONS

This application is the U.S. National Phase of PCT Appln. No. PCT/EP2015/074339 filed Oct. 21, 2015, which claims priority to German Application No. 10 2014 221 928.0 filed Oct. 28, 2014, the disclosures of which are incorporated in their entirety by reference herein.

BACKGROUND OF THE INVENTION

1. Field of the Invention

The invention relates to a fluidized bed reactor and a process for producing polycrystalline silicon granules.

2. Description of the Related Art

Polycrystalline silicon can be produced by means of the Siemens process. In this case a reaction gas comprising one or more silicon-containing components and optionally hydrogen is introduced by means of nozzles into a reactor comprising support bodies heated by direct passage of electric current, wherein silicon is deposited in solid form on the support bodies. Silicon-containing components preferably used are silane ($SiH_4$), monochlorosilane ($SiH_3Cl$), dichlorosilane ($SiH_2Cl_2$), trichlorosilane ($SiHCl_3$), tetrachlorosilane ($SiCl_4$) or mixtures of these substances.

The Siemens process is usually carried out in a deposition reactor (also termed a "Siemens reactor"). In the most common embodiment, the reactor comprises a metallic base plate and a coolable bell which is placed on the base plate in such a manner that a reaction space is formed in the interior of the bell. EP 2 077 252 A2 describes the typical structure of a reactor type used for producing polysilicon.

The base plate is furnished with one or more gas inlet openings and one or more off-gas openings for reaction gases, and also with holders, with the aid of which the support bodies are held in the reaction space and supplied with electric current by electrodes. The feed of reaction gas proceeds by means of one or more nozzles mounted in gas inlet openings.

The support bodies are usually formed in each case of two thin rods and a horizontal bridge. The typical U-shape of the support bodies is generated by the bridge coupling. The support bodies usually consist of polycrystalline silicon. The length of the thin rods on which polycrystalline silicon is deposited can be several meters (about 2 to 3 m are usual).

Polycrystalline silicon granules are produced in a fluidized bed or fluid bed reactor. This is achieved by fluidizing silicon particles by means of a gas flow in a fluidized bed, wherein this fluidized bed is heated up to high temperatures via a heating device. By adding a silicon-containing reaction gas, a deposition reaction proceeds on the hot particle surfaces. In this case, elemental silicon deposits on the silicon particles and the individual particles grow in diameter. By regular takeoff of grown particles and addition of smaller silicon seed particles, the process can be operated continuously with all the advantages associated therewith. As silicon-containing reagent gases, silicon-halogen compounds (e.g. chlorosilanes or bromosilanes), silane ($SiH_4$) and also mixtures of these gases with hydrogen are described.

U.S. Pat. No. 4,900,411 A discloses a process for obtaining high-purity polycrystalline silicon by precipitation of silicon onto high-purity silicon particles from silicon-containing gas such as silane, dichlorosilane, trichlorosilane or tribromosilane, characterized by a reactor having a fluidized bed into which, together with silicon seed particles, a reaction gas is introduced via an introduction tube, and microwaves are supplied in order to heat the fluidized particles, such that polysilicon is precipitated onto the seed particles.

U.S. Pat. No. 7,029,632 B2 discloses a fluid bed reactor having a pressure-bearing casing, an internal reactor tube that transmits heat radiation, an inlet for silicon particles, a tubular inlet for the feed of a reaction gas that divides the fluid bed into a heating zone and a reaction zone situated thereabove, a gas distribution appliance for the feed of a fluidizing gas into the heating zone, an outlet for incompletely reacted reaction gas, fluidizing gas and also the gaseous or vaporous products of the reaction, an outlet for the product, a heating device and also an energy supply for the heating device. In U.S. Pat. No. 7,029,632, it is proposed that the heating device is a radiation source for heat radiation, which is arranged outside the internal reactor tube and without direct contact thereto in a ring shape around the heating zone, and is formed in such a manner that it heats the silicon particles in the heating zone by means of heat radiation to a temperature such that the reaction temperature in the reaction zone is set.

Heating zone and reaction zone are vertically separated. This permits the fluid bed also to be heated with heating methods other than with microwaves, since in the heating zone, no wall deposition can occur, because there is no silicon-containing gas present. Radiative heating with flat heating elements is provided for introducing the heat evenly over the extent of the fluid bed and defined with respect to position.

The heating devices are, for example, heating elements of doped silicon or graphite or silicon carbide, a quartz tube radiator, ceramic radiator or metal wire radiator. Most preferably, the heating device is a serpentine-shape slotted tube made of graphite having an SiC surface coating that is arranged in the reactor so as to be standing or suspended on the electrode connections.

U.S. Pat. No. 4,786,477 A discloses a device for carrying out a process in which a reactor has a gas inlet tube for the reaction gas mixture at the lower end, a gas outlet tube at the upper end and also a feed tube for the silicon seed particles, wherein the reactor consists of quartz, and is located vertically standing on the centre line of a heat generator in which a microwave screening shield is installed in the central part, and which is connected via microwave guide tubes to microwave generators, wherein a gas distributor plate is arranged beneath the reactor and a gas cut off membrane is arranged within each microwave guide tube, and cooling channels are provided between the wall of the heat generator and the outer wall of the reactor and also in the gas distributor plate.

In an embodiment of the device according to U.S. Pat. No. 4,786,477 A, the gas outlet projects outwards and is mounted in loose form, wherein a graphite seal is situated on the connection site to the quartz reactor. The graphite seal is held by a holder which is situated on the side of the gas outlet and which is acted upon by a spring in an axial direction. The connection is thereby held by the spring pressure via the holder on the quartz reactor in a manner so as to seal, even when the reactor moves somewhat.

The upper part of the heat generator through which the gas outlet tube extends outwards, is closed gas-tightly by a PTFE seal and a holder.

The gas inlet tube is connected to the lower end of the heat generator and a gas distribution plate is introduced between the gas inlet tube and the lower end of the quartz reactor. A coolant path is formed in the gas distributor plate. An outlet tube for particles is connected to the lower part of the quartz reactor and extends to a silicon collecting container. A graphite seal prevents the exit of reaction gas at the site between the quartz reactor and the heat generator.

In another embodiment of the device, the upper end of the quartz reactor is connected directly to the gas outlet tube. The lower end has a gas seal which prevents the reaction gas escaping from the heat generator, that is to say an O-ring made of graphite is introduced as seal between the flange of the heat generator and the flange of the quartz reactor and the gas distributor plate, in order that complete gas tightness prevails.

In the prior art, efforts have been made to provide polycrystalline silicon granules having low contamination with dopant materials such as boron and phosphorus.

U.S. Pat. No. 4,883,687 A discloses polycrystalline silicon granules having a size distribution of 150 to 1500 µm, an average size from 650 to 750 µm, a boron content of not more than 0.25 ppba, a phosphorus content of not more than 0.19 ppba. These silicon granules are produced by performing, in a first step, a deposition of silicon on silicon particles at a silane concentration from 10 to 100 mol %, wherein silicon dust is formed, and wherein, in the second step, the silicon particles obtained from the first step are fed to a deposition at a silane concentration from 1 to 5 mol %, whereby the silicon dust is bound to the particles.

U.S. Pat. No. 7,708,828 B2 discloses polycrystalline silicon granules having a low pore fraction and having a phosphorus dopant content of less than 300 ppta, preferably less than 150 ppta, and having a boron dopant content of less than 300 ppta, preferably less than 100 ppta. EP1544167 A1 gives no information on the contamination of the surface of the granules with dopants.

WO 2006/062660 A2 discloses polycrystalline silicon granules having an average boron and phosphorus content in each case of not more than 0.1 ppba.

US 2003/0159647 A1 discloses polycrystalline silicon fragments having impurities of less than or equal to 0.06 ppba of boron and of less than or equal to 0.02 ppba of phosphorus in the bulk. US2003/0159647 A1 gives no information on the contamination of the surface with dopants.

US 2013/0189176 A1 discloses a polycrystalline silicon piece having a concentration of 1-50 ppta of boron and 1-50 ppta of phosphorus on the surface. These comparatively low dopant concentrations are achieved by a multiplicity of measures such as purification of the reaction gases by distillation, use of low-dopant clean room filters and also use of low-dopant claddings of the plants, etc.

For the purity of polycrystalline silicon granules and polycrystalline silicon fragments, the dopant content of the reaction gases used and of the fluidizing gases used in the fluidized bed process are of importance.

US 2012/0193214 A1 therefore discloses a process for the purification of chlorosilanes by distillation, wherein boron and phosphorus impurities are removed.

U.S. Pat. No. 4,871,524 A discloses a process in which hydrogen off-gas from a fluidized bed reactor is brought into contact with activated carbon, whereby phosphorus-containing impurities are removed from the hydrogen. The hydrogen purified in this manner can be fed back to the reactor and serve as a carrier gas for silanes.

Despite all the efforts in the prior art for reducing the dopant concentration, polycrystalline silicon granules and polycrystalline silicon fragments to date have significant impurities, in particular with phosphorus.

From the problems just described, arose the formulation of the object of the invention.

SUMMARY OF THE INVENTION

The invention provides for a fluidized bed reactor for the production of granular polycrystalline silicon granules, wherein seals and/or packings of graphite which contain less than 500 ppmw of phosphorus are employed in the media supply, in the fluidized bed reactors and in the off-gas disposal of the fluidized bed reactors.

The invention likewise provides employing seals and/or packings made of graphite which contain less than 500 ppmw of phosphorus in the media supply, in CVD reactors, and in the off-gas disposal of CVD reactors for production of polycrystalline silicon in rod form (Siemens process). In this case, preferably one or more nozzles in the gas inlet openings in the base plate are sealed. Preferably, the pipelines for reaction gases (hydrogen, chlorosilanes) are sealed. Likewise preferably, the off-gas opening in the base plate which is connected to a pipeline is sealed.

DETAILED DESCRIPTION OF THE PREFERRED EMBODIMENTS

Figure 1:
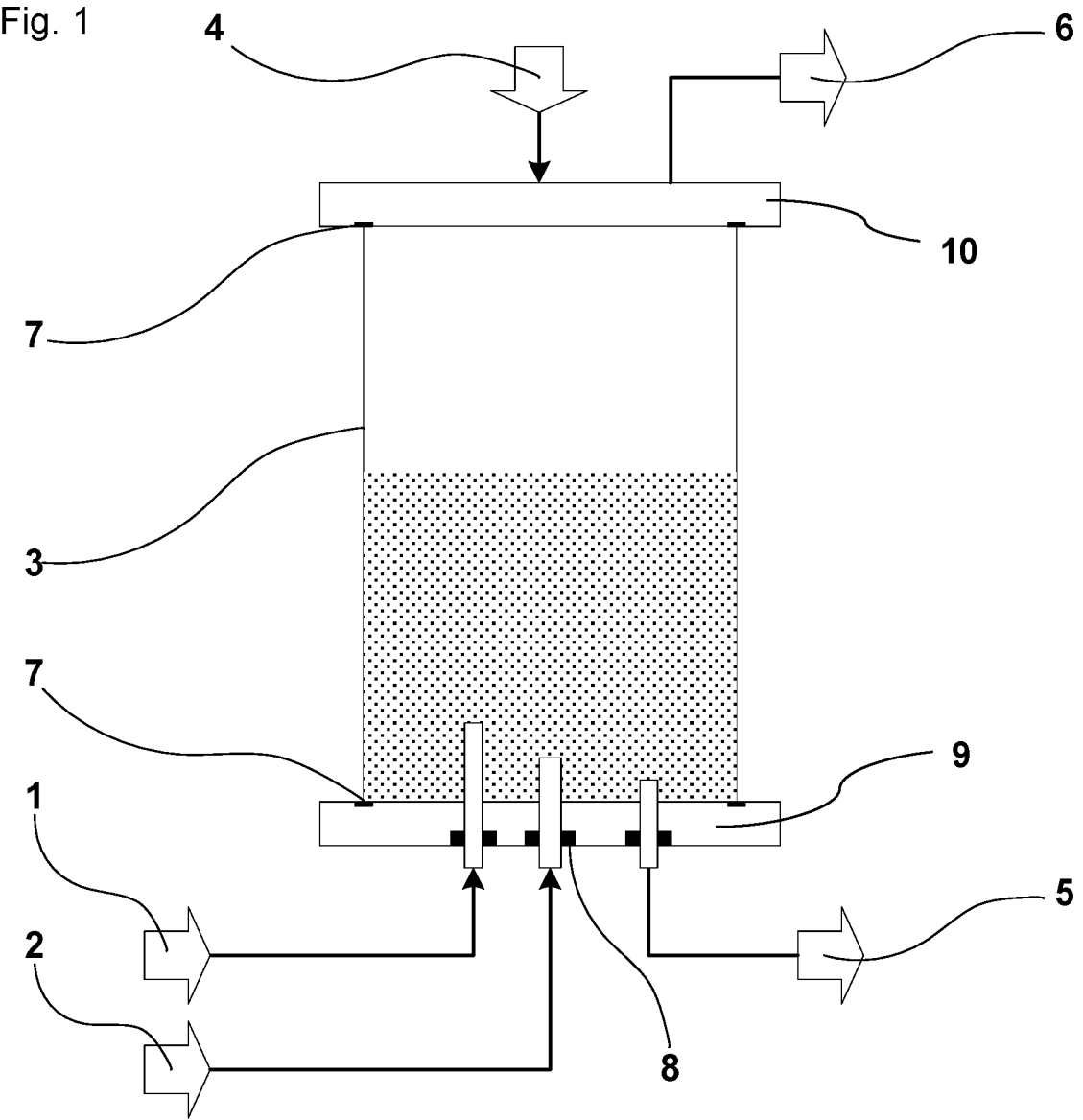
FIG. 1 shows a schematic structure of one embodiment of a fluidized bed reactor.

The inventors have surprisingly and unexpectedly discovered that seals and packings which are used in pipelines for transporting feed gases and liquids ($H_2$, trichlorosilane, HCl) and also in deposition apparatuses for production of high-purity polysilicon, under certain conditions (e.g. at elevated pressure and/or at elevated temperature, at high flow velocity, in the presence of corrosive media) can lead to the contamination of the gases, liquids and products that are passed through. In the deposition to form high-purity silicon, a part of these impurities from the seals is incorporated into the polysilicon. This can be avoided by using particularly low-phosphorus seals.

The invention also relates to a fluidized bed reactor for producing polycrystalline silicon granules, comprising a reactor head (10), a reactor tube (3) and a reactor base (9), additionally comprising a heating device, at least one base gas nozzle for supplying fluidizing gas (2) and also at least one secondary gas nozzle for supplying reaction gas (1), a seed feed appliance (4) for feeding silicon seed particles, a product withdrawal line (5) for polycrystalline silicon granules and also an appliance for removing off-gas (6), wherein base gas nozzle, the at least one secondary gas nozzle and also the product withdrawal line (5) for polycrystalline silicon granules are sealed by means of seals/packings (8) against the reactor base (9) and the reactor tube (3) is sealed against the reactor head (10) and the reactor base (9) by means of seals (7), wherein the seals consist of graphite and contain less than 500 ppmw of phosphorus.

Preferably, seals made of graphite containing less than 500 ppmw of phosphorus are also used in pipelines for media supply or media disposal. This relates to pipelines that supply the reactor with fluidizing gas (in particular hydrogen) or reaction gas (in particular chlorosilane mixtures). In addition, it relates to the off-gas pipelines with which off-gases are removed from the reactor. The seals in this case are used, in particular, for sealing off flange connections.

Preferably, the seals used according to the invention contain less than 5 ppmw of B, As and Sb (in total). This ensures that only very low amounts of the dopants B, As and Sb can emerge from the seals and contaminate the polycrystalline silicon granules.

Preferably, the seals contain less than 1400 ppmw of sulphur. It is known that sulphur is a natural constituent of graphite. By purification and work-up of the graphite, the sulphur content can be reduced to the abovementioned level.

Preferably, the seals contain an ash content of less than 0.3% by weight (determined as specified in DIN 51903). The ash content reflects the total degree of contamination of the graphite with metals. The graphite is burnt at 800° C. under an oxidizing atmosphere and then the amount of ash remaining is weighed and expressed as a ratio to the starting amount. Untreated graphite usually has an ash content of up to 2% by weight. By purification and workup, the ash content can be decreased.

Particular preference is given to seals made of graphite having P<100 ppmw, S<1000 ppmw, B, As, Sb (in total)<1 ppmw, and an ash content <0.1% by weight.

Graphite for packings and packing rings preferably contains less than 20 ppmw of phosphorus and also an ash content of less than 0.25% by weight.

Most preferably, high-purity seals or packing rings made of graphite are used having a P content of less than 1 ppmw and an impurity with Al, As, B, Ba, Be, Bi, Ca, Cd, Co, Cr, Cu, Fe, K, Li, Mg, Mn, Mo, Na, Ni, Pb, S, Sb, Sn, Sr, Ti, V, W, Zn in total of less than 5 ppmw.

This ensures that only very low amounts of phosphorus and said the previously mentioned metals can emerge from the seals and contaminate the polycrystalline silicon granules.

It is advantageous when the graphite film used for the winding of packings has a finite phosphorus content, since phosphorus makes the graphite more elastic.

The element concentrations were determined by means of ETV-ICP/OES (sample feed by means of electrothermal vaporization/ETV; ICP-OES="inductively coupled plasma optical emission spectrometry).

The seals can be flat seals (as specified in DIN EN1514-1) or sealing or packing rings (packings). To seal the nozzles and the withdrawal line for granules, ring-shaped sealing or packing rings surrounding the nozzles or the line are preferably used.

The low-phosphorus graphite seals are preferably used in plant components and pipelines which are operated at temperatures from 150° C. to 900° C. Most preferably, the seals are used in the temperature range from 200° C. to 550° C.

The low-phosphorus graphite seals are preferably used in plant components and pipelines that are operated at over pressures from 1 to 16 bar.

In the case of application temperatures above 450° C., the graphite seals are preferably used with inner and outer flanges made of stainless steel (e.g. X6CrNiMoTi17-12-2, material No. 1.4571), in order to protect the sealing material from direct contact with atmospheric oxygen and thereby to avoid oxidation of the carbon to carbon dioxide. The stainless steel used preferably has a phosphorus content of a maximum of 0.045% by weight, and a sulphur content of a maximum of 0.03% by weight.

At application temperatures of above 600° C. under a hydrogen atmosphere, the seals are preferably constructed in an inner and outer chambered manner in order to prevent methanization of carbon with hydrogen.

The seals are distinguished by a reduced content of external elements in the sealing material, which have a particularly interfering effect in the polysilicon. In particular, the graphite sealing material being used is characterized in that defined low limiting values are maintained for the elements B, P, Al, As, Sb, S and ash content.

Despite a reduced P content in the graphite, the physical and mechanical seal characteristic values as specified in DIN EN 13555 are maintained, such as, e.g., the surface pressure in the installed state for leakage class L=0.001, in such a manner that the use of seals poses no problems in practice.

Even at elevated use temperatures, the seals exhibit a very low P diffusion rate from the graphite sealing material into the medium (e.g. hydrogen, chlorosilane or product).

The invention also relates to a process for producing polycrystalline silicon granules in any one of the fluidized bed reactors described hereinbefore, comprising fluidizing silicon seed particles by means of a gas stream in a fluidized bed which is heated up by means of a heating device, wherein, by adding a silicon-containing reaction gas, polycrystalline silicon is deposited on the hot silicon seed particle surfaces, whereby the polycrystalline silicon granules are formed.

Preferably, the polycrystalline silicon granules are removed from the fluidized bed reactor. Preferably, the process is operated continuously by removing from the reactor particles that have grown in diameter by deposition and adding fresh silicon seed particles.

Preferably, the silicon-containing reaction gas used is trichlorosilane. The temperature of the fluidized bed in the reaction region is in this case preferably 850-1400° C.

It is equally preferred that the silicon-containing reaction gas is silane ($SiH_4$). The temperature of the fluidized bed in the reaction region in this case is preferably 550-850° C.

It is further preferred that the silicon-containing reaction gas used is dichlorosilane. The temperature of the fluidized bed in the reaction region is preferably 600-1000° C.

The fluidizing gas is preferably hydrogen.

The reaction gas is sprayed into the fluidized bed via one or more nozzles. The local gas velocities at the exit of the nozzles is preferably 0.5 to 200 m/s.

The concentration of the silicon-containing reaction gas, based on the total amount of gas flowing through the fluidized bed is preferably 5 mol % to 50 mol %, more preferably 15 mol % to 40 mol %.

The concentration of the silicon-containing reaction gas in the reaction gas nozzles, based on the total amount of gas flowing through the reaction gas nozzles, is preferably 20 mol % to 80 mol %, more preferably 30 mol % to 60 mol %. The silicon-containing reaction gas preferably is trichlorosilane.

The reactor pressure varies in the range from 0 to 7 barg, preferably in the range 0.5 to 4.5 bar gauge pressure.

In the case of a reactor having a diameter of, e.g. 400 mm, the mass flow rate of silicon-containing reaction gas is preferably 200 to 600 kg/h. The hydrogen volumetric flow rate is, preferably, 100 to 300 $Nm^3$/h. For larger reactors, higher amounts of silicon-containing reaction gas and $H_2$ are preferred.

It is clear to a person skilled in the art that some process parameters are ideally selected in dependence on the reactor size. Therefore, hereinafter, operating data normalized to the reactor cross sectional area are cited, in which the process according to the invention is preferably employed.

The specific mass flow rate of silicon-containing reaction gas is preferably 1600-6500 kg/(h*m$^2$).

The hydrogen volume flow is preferably 800-4000 Nm$^3$/(h*m$^2$).

The specific bed weight is preferably 700-2000 kg/m$^2$.

The specific silicon seed particle metering rate is preferably 7-25 kg/(h*m$^2$).

The specific reactor heating output is preferably 800-3000 kW/m$^2$.

The residence time of the reaction gas in the fluidized bed is preferably 0.1 to 10 s, more preferably 0.2 to 5 s.

The features cited with respect to the above described embodiments of the process according to the invention/the use according to the invention can be applied correspondingly to the device according to the invention. Vice versa, the features cited with respect to the above described embodiments of the device according to the invention can be applied correspondingly to the process according to the invention/the use according to the invention. These and other features of the embodiments according to the invention are explained in the description of the figures and in the claims. The individual features can either be effected separately, or in combination as embodiments of the invention. In addition, they can describe advantageous embodiments which themselves are independently patentable.

LIST OF REFERENCE SIGNS

1 Reaction gas
2 Fluidizing gas
3 Reactor tube
4 Seed feed
5 Product withdrawal line
6 Off-gas
7 Seal
8 Seal/packing
9 Reactor base
10 Reactor head
11 Sealing material
12 Outer flange
13 Inner flange
14 Carrier sheet The fluidized bed reactor consists of a reactor container into which a reactor tube 3 is inserted and which is delimited at the top by the reactor head 10 and at the bottom by the reactor base 9.

Between an inner wall of the reactor container and the outer wall of the reactor tube 3, there can be situated an intermediate shell. Such an intermediate shell contains insulation material and is filled with an inert gas or is purged with an inert gas. The pressure in the intermediate shell can be higher than in the reaction chamber which is delimited by the walls of the reactor tube 3.

The fluidized bed made of polysilicon granules is situated in the interior of the reactor tube 3.

The feed gases supplied to the reactor are the fluidizing gas 2 and the reaction gas mixture 1.

The fluidizing gas 2 is supplied via base gas nozzles and the reaction gas mixture 1 is supplied via what are termed secondary gas nozzles (reaction gas nozzles).

The height of the secondary gas nozzles can differ from the height of the base gas nozzles.

In the reactor, owing to the arrangement of the nozzles, a bubbling fluidized bed with additional vertical spraying in of secondary gas forms.

The reactor head 10 can have a larger cross section than the fluidized bed.

Via a seed feed appliance 4, seed is fed to the reactor at the reactor head 10.

The polycrystalline silicon granules are withdrawn at the reactor base 9 via a product withdrawal line 5.

At the reactor head 10, the reactor off-gas 6 is taken off.

The base gas nozzles, secondary gas nozzles and also the product withdrawal line 5 for polycrystalline silicon granules are sealed from the reactor base 9 by means of seals/packings 8. In this case, these are preferably packing rings.

The reactor tube 3 is sealed from the reactor head 10 and the reactor base 9 by means of seals 7. These are preferably flat seals.

The seals/packings 7,8 consist of graphite and contain less than 500 ppmw of phosphorus.

Figure 2:
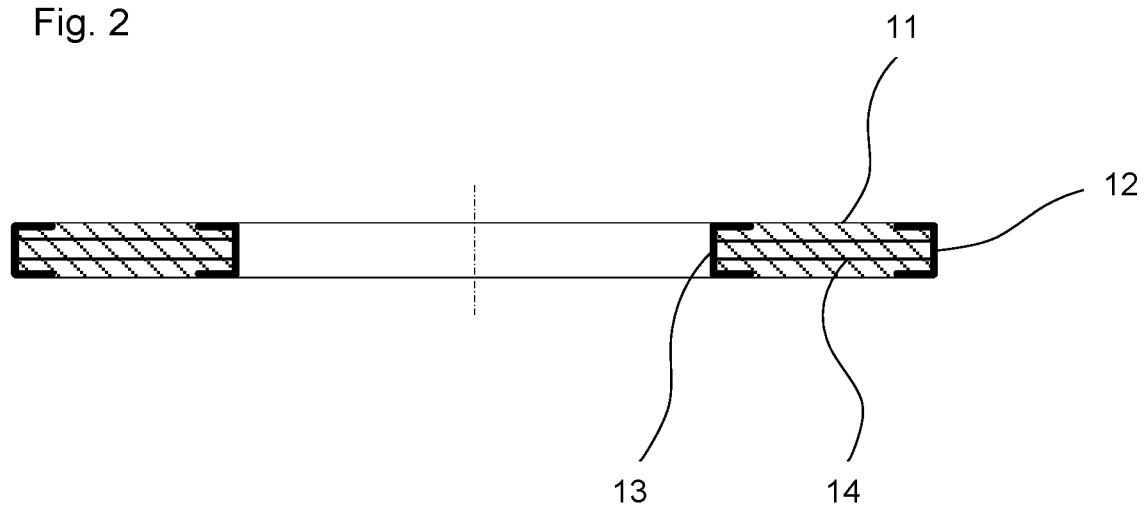
FIG. 2 shows one embodiment of a seal.

FIG. 2 shows an embodiment of a flat seal having sealing material 11, outer flange 12, inner flange 13 and carrier sheet 14.

Outer flange 12 and inner flange 13 consist of stainless steel.

The sealing material 11 is graphite containing less than 500 ppm as phosphorus.

EXAMPLES

A study was made as to what effect the low-phosphorus seals and packing rings have on product quality. For this purpose, as a comparison, seals and packing rings made of standard graphite having varying P content of up to 1000 ppm were used.

First, the seals for pipelines were studied.

In a pipeline for transporting hot hydrogen at 500° C. to a deposition reactor for polysilicon, the seals made of standard graphite having stainless steel inner and outer flanges were replaced by seals made of high-purity low-phosphorus graphite (P content less than 500 ppmw) having a stainless steel inner flange and a stainless steel outer flange.

In a second pipeline for transporting hot trichlorosilane at 300° C. to a deposition reactor for polysilicon, the seals made of standard graphite with stainless steel inner flange were replaced with seals made of low-phosphorus graphite having a stainless steel inner flange.

By replacing the standard seals by low-phosphorus graphite seals, the product quality of the polysilicon granules was able to be improved, since the P content was lowered by 12%.

Finally, in the second step, the seals were studied for sealing the reactor tube from reactor base and reactor head.

For sealing a fluidized bed reaction tube for deposition of polysilicon granules, high-temperature-resistant seals made of standard graphite are used. After these seals had been constructed using the low-phosphorus special graphite (P content less than 500 ppmw), the P content in the polysilicon granules was able to be lowered by a further 12%.

In the third step, the packing rings for sealing the nozzles and/or the gas passages through the reactor base were studied.

For sealing gas passages in a fluidized bed reactor for producing high-purity Si granules, standard graphite packings are used. By using packing rings made of special graphite having particularly low P content (<1 ppmw), the P content of the polysilicon granules was able to be reduced by 10%.

The above description of exemplary embodiments is to be understood by way of example. The disclosure made thereby permits those skilled in the art, firstly, to understand the present invention and the advantages associated therewith, and secondly comprises alterations and modifications of the described structures and processes that are obvious within the competence of a person skilled in the art. Therefore, all such alterations and modifications and also equivalents are to be covered by the scope of protection of the claims.

The invention claimed is:

1. In a fluidized bed reactor for producing polycrystalline silicon granules comprising a reactor head, a reactor tube and a reactor base, and additionally comprising a heating device, at least one base fluidizing gas supply nozzle and also at least one secondary reaction gas supply nozzle, a seed particle feeder, a polycrystalline silicon granule product withdrawal line, and also an off-gas removal appliance, the improvement comprising: providing high purity graphite seals to seal at least one of the base fluidizing gas nozzle, the at least one secondary reaction gas supply nozzle, or the polycrystalline silicon granule product withdrawal line, against the reactor base, or to seal the reactor tube against the reactor head and the reactor base, wherein the seals comprise chambered seals of graphite containing less than 500 ppmw of phosphorus, between inner and outer flanges of stainless steel.

2. The fluidized bed reactor of claim 1, wherein the graphite of the seals contain less than 5 ppmw of boron, arsenic and antimony in total.

3. The fluidized bed reactor of claim 1, wherein the graphite of the seals contain less than 1400 ppmw of sulfur.

4. The fluidized bed reactor of claim 2, wherein the graphite of the seals contain less than 1400 ppmw of sulfur.

5. The fluidized bed reactor of claim 1, wherein the graphite of the seals has an ash content of less than 0.3% by weight.

6. The fluidized bed reactor of claim 1, wherein the graphite of the seals contains less than 100 ppmw of phosphorus, less than 1000 ppmw of sulfur, less than 1 ppmw of boron, arsenic and antimony in total, and have an ash content of less than 0.1% by weight.

7. The fluidized bed reactor of claim 1, wherein the graphite of the seals contain less than 1 ppmw of phosphorus and less than 5 ppmw of impurities containing any of Al, As, B, Ba, Be, Bi, Ca, Cd, Co, Cr, Cu, Fe, K, Li, Mg, Mn, Mo, Na, Ni, Pb, S, Sb, Sn, Sr, Ti, V, W, and Zn in total.

8. The fluidized bed reactor of claim 1, wherein the graphite of the seals contains phosphorus in a range of from 1 ppmw to 500 ppmw of phosphorus.

9. The fluidized bed reactor of claim 1, wherein the graphite of the seals contains phosphorus in a range of from 1 ppmw to 20 ppmw of phosphorus.

10. The fluidized bed reactor of claim 1, further comprising a hydrogen gas supply line having at least one chambered graphite seal with inner and outer stainless steel flanges, the graphite of the chambered graphite seal having a phosphorus content of less than 50 ppm.

11. The fluidized bed reactor of claim 1, further comprising a reactor offgas line having at least one chambered graphite seal with inner and outer stainless steel flanges, the graphite of the chambered graphite seal having a phosphorus content of less than 50 ppm.

12. In a process for producing polycrystalline silicon granules comprising fluidizing silicon seed particles by means of a gas stream in a fluidized bed heated by means of a heating device, wherein, by adding a silicon-containing reaction gas, polycrystalline silicon is deposited on the hot silicon seed particle surfaces, forming polycrystalline silicon granules, the improvement comprising conducting the process in a reactor of claim 1.

* * * * *